United States Patent [19]
Chimura et al.

[11] 3,968,517
[45] July 6, 1976

[54] APPARATUS FOR MAGNETICALLY RECORDING AND/OR REPRODUCING VIDEO SIGNALS AND WHICH HAS A STILL MOTION REPRODUCING MODE OF OPERATION

[75] Inventors: Toshihiko Chimura; Hirokimi Iwata, both of Atsugi, Japan

[73] Assignee: Sony Corporation, Tokyo, Japan

[22] Filed: Nov. 11, 1974

[21] Appl. No.: 522,758

[30] Foreign Application Priority Data
Nov. 15, 1973  Japan............... 48-131978[U]

[52] U.S. Cl................................... 360/10; 360/33; 360/84; 360/85
[51] Int. Cl.²...................... H04N 5/78; G11B 15/42
[58] Field of Search................ 178/6.6 FS; 360/10, 360/85, 84, 14, 35, 33, 77

[56] References Cited
UNITED STATES PATENTS

| | | | |
|---|---|---|---|
| 2,832,840 | 4/1958 | Morin............................. | 178/6.6 FS |
| 3,557,320 | 1/1971 | Hopf.............................. | 178/6.6 FS |
| 3,697,676 | 10/1972 | Protas............................ | 360/10 |
| 3,825,944 | 7/1974 | Terao............................ | 360/85 |
| 3,829,892 | 8/1974 | Nagahiro........................ | 360/84 |
| 3,831,198 | 8/1974 | Kihara........................... | 360/85 |
| 3,869,709 | 3/1975 | Yamagishi...................... | 360/14 |

*Primary Examiner*—Bernard Konick
*Assistant Examiner*—Alan Faber
*Attorney, Agent, or Firm*—Lewis H. Eslinger; Alvin Sinderbrand

[57] ABSTRACT

In an apparatus in which a magnetic tape extending between supply and take-up reels is guided in a helical path about at least a portion of the periphery of a guide drum having one or more rotary magnetic heads associated therewith, and the tape is longitudinally driven, during recording and normal reproducing operations, by a capstan and a pinch roller pressed against the capstan with the tape therebetween, so that video signals are recorded and normally reproduced by the rotary heads in parallel record tracks extending obliquely across the tape at an angle determined by the helical path of the tape on the guide drum, the rotational speed of the heads and the speed of longitudinal movement of the tape by the capstan, and in which, for still motion reproducing operation, the pinch roller is moved away from the capstan to halt the driving of the tape thereby and permit the heads to repeatedly reproduce the signals recorded in one of the oblique tracks while scanning along a line that is at an angle to such track so that guard band noises appear in the reproduced signals; a manually actuable device is provided for conveniently shifting the longitudinal position of the tape relative to the circular path of the rotary magnetic heads during such still motion reproducing operation so as to make such guard band noises as inconspicuous as possible when the reproduced signals are displayed as a still motion video picture. Such manually actuable device includes an arm pivoted about the axis of rotation of the support member for the supply reel and being angularly displaceable in opposed directions, and a drive member mounted on the arm for wedge-like engagement with a cylindrical surface on the supply reel support member when the arm is displaced in one direction and for sliding relative to such surface when the arm is displaced in the opposite direction. Further, the drive member is securely held out of engagement with the supply reel support member during fast forward and rewind operations of the apparatus.

13 Claims, 5 Drawing Figures

APPARATUS FOR MAGNETICALLY RECORDING AND/OR REPRODUCING VIDEO SIGNALS AND WHICH HAS A STILL MOTION REPRODUCING MODE OF OPERATION

BACKGROUND OF THE INVENTION

1. Field of the Invention

This invention relates generally to magnetic recording and/or reproducing apparatus, such as, video tape recording and reproducing apparatus (VTR), and more particularly is directed to improvements in such apparatus having a still motion reproducing mode of operation during which the video signals corresponding to a selected frame or field are repeatedly reproduced.

2. Description of the Prior Art

Existing video tape recording and reproducing apparatus generally comprise a tape guide drum having one or more rotary magnetic heads associated therewith to record or reproduce video signals on a magnetic tape which is usually wound on supply and take-up reels with the tape between such reels being wrapped helically about at least a portion of the circumferential surface of the drum and being driven, during recording and normal reproducing operations, by a cooperating capstan and pinch roller and by suitable rotation of the take-up reel. Thus, during recording operation, the rotary heads record the video signals in successive parallel record tracks that extend obliquely across the tape at an angle to the longitudinal direction of the latter determined by the helical path of the tape on the guide drum, the rotational speed of the heads and the speed at which the tape is longitudinally driven by the capstan. During such recording operation, the rotation speed of the rotary heads is usually selected so that a field of video signal information will be recorded in each record track. During normal reproducing operation, the rotary speed of the heads and the speed at which the capstan drives the tape are the same as for the recording operation so that the rotary heads can accurately span the successive oblique record tracks and reproduce the successive fields of video signal information recorded therein.

When still motion reproducing operation of the described apparatus is desired, the longitudinal movement of the tape is halted, for example, by moving the pinch roller away from the capstan, so that the rotary heads will repeatedly scan along a track which extends obliquely across the tape at an angle determined only by the helical path of the tape on the guide drum and, hence, which is inclined relative to the oblique record tracks. Thus, depending upon the random position of the tape in which the longitudinal movement thereof has been halted, the track along which the rotary heads scan the stationary tape may be disposed relative to the record tracks on the tape anywhere between a first position in which the scanning track intersects a record track adjacent the middle of the latter and deviates from such record track at the opposite ends thereof, and a second position in which the ends of the scanning track intersect two adjacent record tracks at the opposite ends of the latter and the middle portion of the scanning track extends across the guard band or spacing between the two adjacent record tracks. In either case, the video signals repeatedly reproduced during a still motion reproducing operation will contain so-called guard band noises which produce characteristic disturbances in the video picture obtained when the reproduced video signals are displayed by a monitor or the like. However, if the tape is halted with the scanning track of the rotary heads in the above described second position relative to the record tracks on the tape, the disturbance due to the guard band noises will extend horizontally across the center of the picture or image displayed on the monitor screen and thus be most disruptive. On the other hand, if the scanning track of the rotary heads is in the above described first position relative to the record tracks on the tape, the disturbances due to the guard band noises will extend across the top and bottom of the displayed picture where they are least conspicuous and interfere as little as possible with viewing of such picture.

In existing video tape recording and reproducing apparatus of the open-reel type, that is, in which the supply and take-up reels are readily accessible during operation of the apparatus, it has been the practice, after longitudinal movement of the tape has been halted for a still motion reproducing operation, to manually turn either the supply reel or the take-up reel for adjusting the position of the stationary tape relative to the scanning track of the rotary heads until the disturbances due to guard band noises occupy the positions in which they are least conspicuous, as indicated above. However, such adjustment of the position of the tape by direct manipulation of the supply or take-up reel is troublesome even in the case of an open-reel type apparatus, and is impossible in the case where the supply and take-up reels are contained in a cassette housing and, therefore, are not accessible for such manipulation.

OBJECTS AND SUMMARY OF THE INVENTION

Accordingly, it is an object of this invention to provide a magnetic tape recording and/or reproducing apparatus with a device by which the position of the magnetic tape having video signals recorded thereon can be conveniently adjusted during a still motion reproducing operation of the apparatus so as to cause disturbances due to guard band noises contained in the repeatedly reproduced video signals to occupy the positions in the resulting displayed picture or image in which they are least conspicuous.

Another object is to provide a device for adjusting the longitudinal position of the magnetic tape during a still motion reproducing operation, as aforesaid, and which is particularly suited for application to a cassette-type video recording and/or reproducing apparatus, that is, one in which supply and take-up reels having the magnetic tape wound thereon are contained in a cassette housing and thus are not accessible during still motion reproducing or other operations of the apparatus.

A further object is to provide a device which is operative for adjusting the longitudinal position of the magnetic tape during a still motion reproducing operation of the apparatus, as aforesaid, but which is securely maintained in an operative condition during fast forward and rewind operations of the apparatus.

Still another object is to provide a device for longitudinally adjusting the position of the magnetic tape during a still motion reproducing operation, as aforesaid, and which is particularly suited for application to a cassette type video signal recording and/or reproducing apparatus provided with an automatic tape loading and unloading device.

In accordance with an aspect of this invention, an apparatus for magnetically recording and/or reproducing video signals on a magnetic tape which is wound on, and extends between supply and take-up reels comprises a cylindrical tape guide drum having rotary magnetic heads moved in a circular path, rotatable supply and take-up reel support members engageable by the supply and take-up reels, a reel drive assembly for urging the take-up reel support member to rotate in the direction for winding the tape on the take-up reel, and thereby unwinding tape from the supply reel, during normal recording and reproducing operations of the apparatus, a capstan spaced from the guide drum, tape guiding elements engageable with the tape between the reels for guiding the tape in a helical path about at least a portion of the periphery of the drum and past the capstan, a pinch roller movable toward and away from the capstan with the tape therebetween, an actuator moving the pinch roller against the capstan for driving of the tape by the latter during the recording and normal reproducing operations and moving the pinch roller away from the capstan during a still motion reproducing operation of the apparatus for interrupting the driving of the tape by the capstan, a brake assembly which is frictionally applied to the supply reel support member during the still motion reproducing operation for holding the supply reel against turning in response to the urging of the tape-up reel support member in the direction for winding the tape on the take-up reel, and a tape positioning device normally disengaged from the supply reel support member and being manually actuable during the still motion reproducing operation to securely engage the supply reel support member for turning the latter against the frictional resistance of the brake assembly.

In accordance with a feature of this invention, the device for adjusting the longitudinal position of the tape on the guide drum includes an arm pivoted about the axis of rotation of the supply reel support member, manually operable means, such as, a rotatable knob connected with the pivoted arm, for angularly displacing such arm in opposed directions, and a drive member mounted on the arm so as to have wedge-like engagement with a cylindrical surface on the supply reel support member when the arm is angularly displaced in one direction and being slidable relative to such cylindrical surface when the arm is angularly displaced in the opposite direction.

In a preferred embodiment of the invention, the above mentioned drive member is pivotally mounted on the arm and has an arcuate drive surface which is eccentric in respect to the pivoting axis of the drive member on the arm so that the opposite end portions of the arcuate drive surface are at radial distances from the pivoting axis that are respectively larger and smaller than the radial distance from the pivoting axis of the drive member on the arm to the cylindrical surface on the supply reel support member, and the drive member is yieldably urged, as by a spring, to pivot relative to the arm in the direction for moving its arcuate drive surface against the cylindrical surface on the supply reel support member.

In accordance with another feature of this invention, the drive member having an arcuate drive surface, as aforesaid, is provided with a pin engaging a fixed cam surface by which the arcuate drive surface is held out of engagement with the cylindrical surface on the supply reel support member except when the arm is angularly displaced in the direction for effecting the wedge-like engagement of the drive member with such cylindrical surface. Further, it is a feature of this invention to provide a movable blocking member associated with the fixed cam surface for maintaining the drive member out of engagement with the cylindrical surface of the supply reel support member during the fast forward and rewind operations of the apparatus, even if the arm carrying the drive member is inadvertently angularly displaced during such operations.

The above, and other objects, features and advantages of the invention, will be apparent in the following detailed description of an illustrative embodiment of the invention which is to be read in connection with the accompanying drawings.

BRIEF DESCRIPTION OF THE DRAWINGS

FIG. 5 is a detail view illustrating a blocking element included in the device according to this invention for preventing the inadvertent operation of such device during a fast forward or rewind operation of the apparatus.

DESCRIPTION OF A PREFERRED EMBODIMENT

Figure 1:
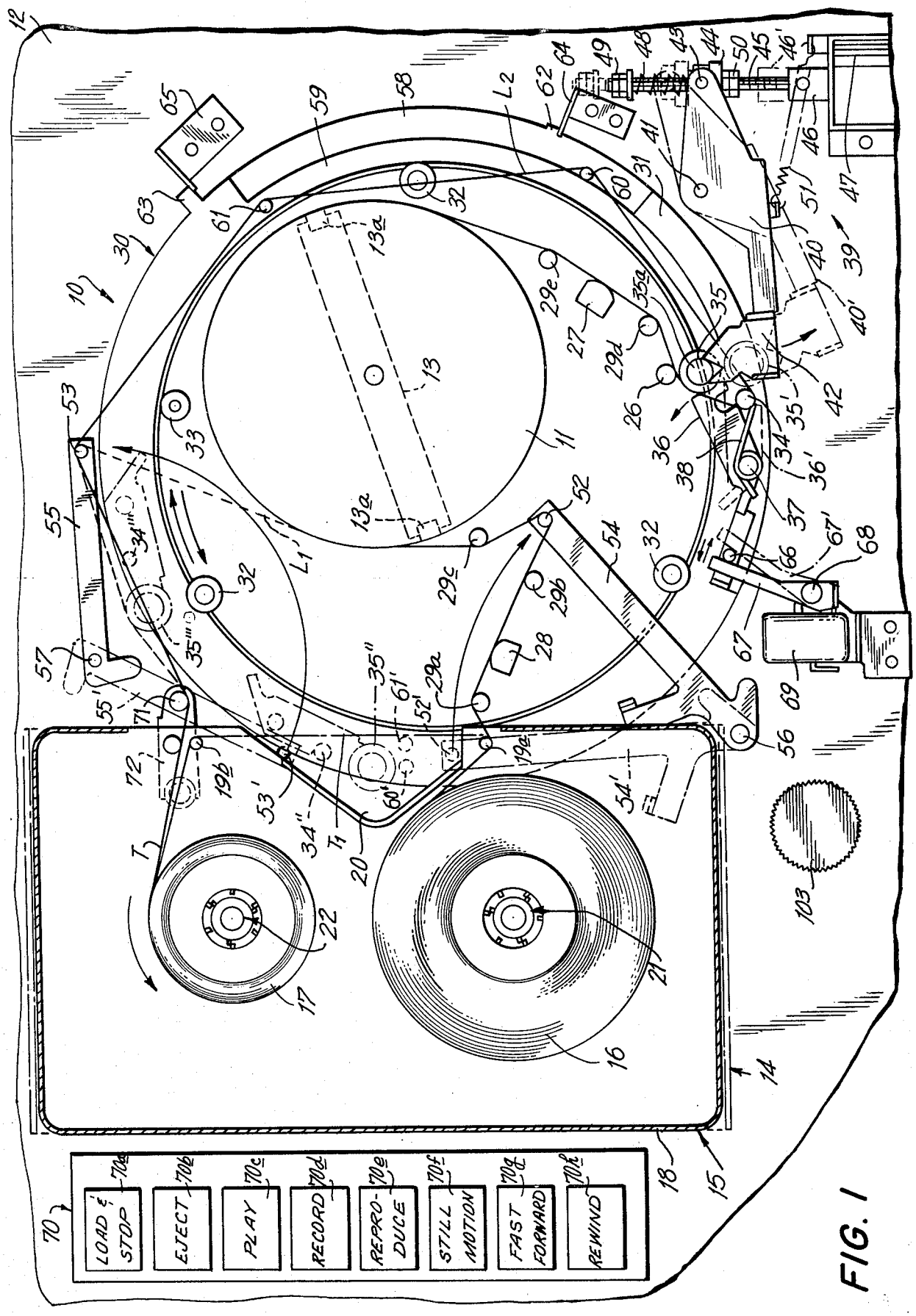
FIG. 1 is a schematic top plan view of a video tape recording and/or reproducing apparatus to which the present invention is particularly applicable and which has an automatic tape loading and unloading device shown in full lines in its operative position for a recording or normal reproducing operation of the apparatus.

Referring to the drawings in detail, and initially to FIG. 1 thereof, it will be seen that a video tape recording and/or reproducing apparatus to which the present invention is applicable may be generally of the type disclosed in U.S. Pat. No. 3,740,492, issued June 19, 1973 and having a common assignee herewith. Such apparatus is identified generally by the reference numeral 10 and is shown to comprise a cylindrical tape guide drum 11 mounted on a chassis 12 and having a circumferential slot or gap (not shown), and a rotary magnetic head assembly 13 mounted on drum 11 and including one or more magnetic heads 13a which are moved along the slot or gap, that is, in a circular path substantially coinciding with the peripheral surface of drum 11. A cassette holding device 14 (shown schematically in broken lines) is suitably mounted on the chassis in front of guide drum 11 and is adapted to move downwardly from an elevated position, at which it may receive a tape cassette 15, to a lowered position at which the cassette is operatively positioned for the various operating modes of apparatus 10. The cassette 15 is shown to include a supply reel 16 and a takeup reel 17 rotatably contained within a housing 18 and having a magnetic tape T wound thereof. The magnetic tape extending between reels 16 and 17 is guided about guide pins 19a and 19b so as to normally follow a path including a run, indicated in broken lines at $T_1$, between guide pins 19a and 19b at which the tape is exposed through an opening 20. Such opening 20 is formed along a side and in the adjacent bottom portion of housing 18 between guide pins 19a and 19b and faces toward guide drum 11 when cassette 15 is received and positioned by holding device 14.

Rotatable reel support members 21 and 22 (FIGS. 1 and 3) are mounted above chassis 12 and are respectively engageable with the hubs of supply and take-up reels 16 and 17 when cassette 15 is operatively positioned by holding device 14. Suitable drive assemblies (not shown) may be provided for urging takeup reel support member 22 to rotate in the direction for winding the tape T on take-up reel 17 during recording, reproducing and fast-forward operations of the apparatus 10, and for driving supply reel support member 21 in the direction for rewinding the tape on supply reel 16 during rewinding operation of the apparatus. As shown particularly on FIG. 3, the take-up reel support member 22 is preferably urged to rotate in the direction for winding the tape on the take-up reel during the recording operation and the normal and still motion reproducing operations of apparatus 10 through an idler wheel 23 which is engageable with the periphery of a clutch element 24 rotatable coaxially with support member 22 and carrying a felt ring 25 frictionally engaging take-up reel support member 22 so that only a limited torque can be applied to support member 22 by way of clutch element 24. Thus, during operation of the drive assembly for rotating take-up reel support member 22, clutch element 24 can slip relative to support member 22, as when the winding of tape on take-up reel 17 is prevented during a still motion reproducing operation of apparatus 10, as hereinafter described. Of course, during a fast-forward operation of apparatus 10, the drive assembly associated with reel support member 22 may directly engage the rim thereof, rather than driving the member 22 through idler 23 and clutch element 24.

The recording and/or reproducing apparatus 10 is further shown to include a capstan 26 which is suitably driven from a drive motor (not shown), a fixed magnetic head assembly 27 for recording and/or reproducing audio and control signals, an erasing head 28 and tape guides 29a–29e, all of which are mounted on chassis 12 at predetermined spaced apart positions, as shown. In order to effect the recording and normal reproducing operations of apparatus 10, it is necessary to withdraw the tape from between reels 16 and 17 of cassette 15 on holding device 14 and to guide or load such tape in a helical path about at least a portion of the periphery of guide drum 11 for scanning by rotary magnetic head assembly 13, and further to engage the magnetic tape with capstan 26 and also with the fixed magnetic heads 27 and 28. When it is desired to remove the cassette 15 from the apparatus at the conclusion of a recording or reproducing operation, it is necessary to unload the tape from about drum 11 and to return the tape to within the cassette housing 18.

In the illustrated apparatus, a device 30 for performing the above described tape loading and unloading functions is shown to include a support member 31 which is preferably in the form of a ring, and which is rotatable about guide drum 11 in a circular or arcuate path that extends under the opening 20 of cassette housing 18 when the cassette is operatively positioned by holding device 14. The axis of the guide drum 11 is preferably inclined relative to the perpendicular to the plane of the circular path of travel of ring 18. Further, the support ring 31 may be disposed eccentrically with respect to guide drum 11 to provide a relatively large space therebetween for accommodating capstan 26, heads 27 and 28 and tape guides 28a–29e. Support ring 31 may be rotatably supported by grooved rollers 32 which engage the inner periphery of ring 31 and are suitably mounted above chassis 12. In order to effect turning of support ring 31 about guide drum 11, the inner periphery of ring 31 may be frictionally engaged by a drive roller 33 which is rotatable by a suitable reversible electric motor (not shown).

Projecting upwardly from support ring 31 is a tape engaging member or pin 34. Also mounted on support ring 31 adjacent tape engaging pin 34 is a freely rotatable, upstanding pinch roller 35 carried by a support arm 36 which is pivoted on ring 31, as at 37. Support arm 36 is located on ring 31 so that, when the latter is turned to its operative position to dispose tape engaging pin 34 and pinch roller 35 to the positions shown in full lines on FIG. 1, pinch roller 35 is adjacent capstan 26 for cooperation with the latter in driving the magnetic tape therebetween. In the apparatus as shown, a spring 38 acts on support arm 36 to urge the latter outwardly relative to ring 31 to the position shown in broken lines at 36' on FIG. 1 at which the support arm engages against member 34 and the pinch roller 35' is spaced from capstan 26 to halt the driving of the tape by the latter, as during a still motion reproducing operation of apparatus 10. In order to press pinch roller 35 against capstan 26 with the tape therebetween for driving of the tape by capstan 26 during a recording or normal reproducing operation of the apparatus, the latter is shown to include an actuating device 39 having a lever 40 swingable on a pivot pin 41 extending from the chassis. One end portion of lever 40 carries an actuating head 42 which is engageable against an axle 35a of pinch roller 35, and the opposite end portion of lever 40 is pivotally connected, at 43, to a slide 44 which is movable along a threaded rod 45 pivotally connected to the armature 46 of an actuating solenoid 47. A spring 48 is provided on threaded rod 45 between adjusting nuts 49 and slide 44 for yieldably urging the latter axially against stop nuts 50 adjustably positioned on rod 45. Thus, when solenoid 47 is energized to retract its armature 46, as shown in full lines on FIG. 1, spring 48 urges slide 44 to move with stop nuts 50 so as to turn lever 40 in the clockwise direction, as viewed, and thereby to cause head 42 to act against axle 35a for pivoting support arm 36 to the position shown in full lines and thereby pressing pinch roller 35 against capstan 26. On the other hand, when solenoid 47 is deenergized, a spring 51 connected between lever 40 and a suitable anchor on the housing of solenoid 47 causes counterclockwise pivoting of lever 40 to the position indicated in broken lines at 40', with the result that head 42 is moved away from axle 35a to permit spring 38 to pivot support arm 36 to the position shown at 36' and thereby space pinch roller 35' from capstan 26. Such pivoting of lever 40 is obviously accompanied by the extension of armature 46, for example, to the position indicated in broken lines at 46'.

When support ring 31 is turned in the counterclockwise direction through approximately 260° from its operative position shown in full lines on FIG. 1 to its starting or inactive position, tape engaging pin 34 and pinch roller 35 are at the locations respectively indicated in broken lines at 34'' and 35'' on FIG. 1. It will be apparent that, with support ring 31 in such starting or inactive position, the downward movement of cassette 15 on holding device 14 causes the tape engaging member and pinch roller at the positions indicated at 34'' and 35'', respectively to project upwardly into opening 20 of cassette housing 18 at the side of tape run $T_1$ facing away from guide drum 11.

Tape loading and unloading device 30 is further shown to include tape guiding pins 52 and 53 projecting upwardly from support arms 54 and 55, respectively, which are swingable on pivot pins 56 and 57 extending from the chassis at locations adjacent the opposite sides of the operatively positioned cassette 15. Suitable actuating mechanisms (not shown) which may be responsive to the rotation of support ring 31 are provided for disposing arms 54 and 55 in the positions shown in broken lines at 54' and 55' on FIG. 1 when support ring 31 is in its starting or inactive position, with the result that the respective tape guiding pins shown in broken lines at 52' and 53' then also project upwardly into opening 20 of cassette housing 18 at the side of tape run $T_1$ facing away from guide drum 11. The actuating mechanisms for arms 54 and 55 are effective to move the latter to the position shown in full lines on FIG. 1 in response to the turning of support ring 31 away from its inactive or starting position.

Also mounted on support ring 31 are auxiliary rings 58 and 59 which are turnable relative to each other and relative to main support ring 31, but which are frictionally urged to rotate, as a unit, with ring 31. Tape guide pins 60 and 61 project upwardly from auxiliary rings 58 and 59, respectively, and, in the starting or inactive position of support ring 31, the auxiliary rings 58 and 59 are rotationally positioned in respect to ring 31 so that the tape guide pins 60 and 61 will be disposed circumferentially adjacent each other, as indicated in broken lines at 60' and 61', and also adjacent the pinch roller in the position 35'' of the latter. Thus, with support ring 31 in its starting or inactive position, tape guide pins 60' and 61' will also project upwardly into opening 20 of the operatively positioned cassette housing.

A relatively short radial lug 62 and a relatively longer radial lug 63 project outwardly from auxiliary rings 58 and 59, respectively, and are engageable with respective stops 64 and 65 secured on the chassis at spaced apart locations along the circular path of ring 31. During the rotation of support ring 31 in the clockwise direction, as viewed on FIG. 1, from its starting or inactive position, both auxiliary rings 58 and 59 initially move with ring 31 until the latter attains a position at which radial lug 63 engages the respective stop 65 for arresting further rotation of auxiliary ring 59 with guide pin 61 in the position shown in full lines on FIG. 1. Thereafter, during further clockwise rotation of support ring 31, the relatively short lug 62 on auxiliary ring 58 moves past stop 65 so that auxiliary ring 58 can continue to turn with support ring 31 until its rotation is arrested by the engagement of lug 62 by stop 64 with the respective tape guide pin 60 in the position shown in full lines. Thereafter, the further turning of support ring 31 to its operative position continues with auxiliary rings 58 and 59 being held against rotation therewith by stops 64 and 65. During the counterclockwise return of support ring 31 from its operative position to its starting or inactive position, auxiliary rings 58 and 59 initially turn in the counterclockwise direction with support ring 31 until the rotational movements of the auxiliary rings are successively arrested by a suitable stop (not shown) with the respective tape guide pins being disposed at the locations indicated in broken lines at 60' and 61'.

In order to limit the rotation of support ring 31 in the clockwise direction to its previously mentioned operative position, a pin 66 projects upwardly from ring 31 adjacent the pivot pin 37 for the pinch roller support arm 36 so that, as ring 31 nears its operative position, pin 66 engages an arm 67 which extends over the path of ring 31 from a pivot 68 fixed to the chassis, and which is urged to the normal position indicated in broken lines at 67', as by a torsion spring (not shown). During the final increment of movement of ring 31 to its operative position, arm 67 is displaced to the position shown in full lines on FIG. 1 from its normal position indicated in broken lines at 67', and such angular displacement of arm 67 causes the latter to actuate a microswitch 69. The actuation of microswitch 69 is effective to halt the operation of the motor associated with drive roller 33 by which support ring 31 is rotated.

The apparatus 10 to which the present invention is applied may have a control button assembly 70, for example, made up of pushbuttons 70a–70h which are adapted to be selectively actuated or depressed for causing associated control circuits and/or mechanisms (not shown), to select various modes of operation of the apparatus 10. More specifically, the pushbutton 70a may be actuated, following the disposition of a cassette 15 in its operative position on holding device 14, to initiate a tape loading operation of device 30 starting from the condition of the latter having support ring 31 in its inactive or starting position so that tape engaging pin 34'', pinch roller 35'', and tape guide pins 52',53',60' and 61' all extend upwardly into opening 20 of the operatively positioned cassette housing. The actuation of pushbutton 70a causes turning of support ring 31 through approximately 60° from its starting or inactive position to a so-called "stop" position, whereby to dispose the tape engaging member and pinch roller on the support ring at the positions indicated in broken lines at 34''' and 35'', respectively. During such turning of support ring 31 through approximately 60° to its stop position, arms 54 and 55 carrying tape guide pins 52 and 53 are angularly displaced to the positions shown in full lines on FIG. 1 so as to withdraw the tape between reels 16 and 17 from cassette housing 18 and to form such withdrawn tape into a loop following the path indicated in broken lines at $L_1$. With support ring 31 in the above described stop position, either pushbutton 70g or pushbutton 70h can be actuated to effect the fast forward operation or rewind operation of apparatus 10, that is, either the rapid rotation of take-up reel 17 for winding the tape thereon from supply reel 16, or the rapid rotation of supply reel 16 for rewinding the tape on the latter from take-up reel 17.

Further, with support ring 31 in its stop position, the actuation of pushbutton 70b for selecting an ejecting mode of the apparatus is effective to cause counterclockwise turning of support ring 31 back to its starting or inactive position while arms 54 and 55 are returned to their initial positions shown in broken lines at 54' and 55', whereupon cassette holding device 14 may be returned to its elevated position at which cassette 15 is ejected therefrom.

After support ring 31 has been moved to its stop position in response to the actuation of pushbutton 70a, the pushbutton 70c may be actuated to select the play mode of apparatus 10. In response to actuation of pushbutton 70c, ring 31 is further rotated in the clockwise direction from its stop position to its operative position, as previously described, and, during such further rotation of ring 31, the loop of tape withdrawn from cassette 15 is lengthened, as indicated at $L_2$. With support ring 31 in its play or operative position, it will be seen that the tape of loop $L_2$ extends, from supply reel 16 and guide pin 19a in the cassette, past guide pin 29a, erasing head 28 and guide pins 29b, 52 and 29c tangentially to the periphery of guide drum 11 so as to be wrapped about a substantial portion of such periphery. Upon leaving the peripheral surface of guide drum 11, the tape travels past guide pin 29e, fixed recording and reproducing head 27 and guide pin 29d to tape engaging member 34 with the pinch roller being then disposed in its inoperative position indicated in broken lines at 35'. The tape turns about tape engaging member 34 and returns past pinch roller 35' and guide pins 60,61 and 53 which are effective to hold the return run of the tape loop spaced from the periphery of guide drum 11, as shown. From guide pin 53, the tape is returned to cassette 15, and hence to the take-up reel 17 therein. Due to the relative inclination of the axis of guide drum 11 and the perpendicular to the plane of rotation of support ring 31, the tape wrapped about the periphery of drum 11 follows a helical path on the latter.

With support ring 31 in its operative or play position, the actuation of pushbutton 70d or pushbutton 70e is effective to cause energizing of solenoid 47 so that actuating device 39 presses pinch roller 35 against capstan 26 with the tape therebetween for causing the rotated capstan 26 to drive the tape during a recording operation or a normal reproducing operation, respectively, of the apparatus 10. During a normal reproducing operation of apparatus 10 initated by the actuation of pushbutton 70e, the actuation of pushbutton 70f is effective to select the still motion reproducing operation of apparatus 10 during which solenoid 47 is deenergized so that pinch roller 35 is returned to the position indicated at 35' for halting the driving of the tape by capstan 26, while the signal reproducing circuits of the apparatus continue to operate to cause rotary heads 13a to repeatedly reproduce video signals recorded in a record track being repeatedly scanned thereby. During either a recording or normal reproducing operation of apparatus 10 initiated by actuation of the pushbutton 70d or 70e, respectively, the actuation of pushbutton 70a is effective to stop or halt such recording or normal reproducing operation and to cause the return of support ring 31 to the stop position described above.

Guide pin 52 and pivoted arm 54 carrying the same may, in addition to guiding the tape for engagement with the erasing head 28, as described above, form part of a braking system by which the back tension in the tape is controlled during recording and normal reproducing operations of apparatus 10, for example, as disclosed in detail in U.S. Pat. No. 3,833,921. For example, pivoted arm 54 may be connected to a band brake (not shown) which is engageable with the supply reel support member 21 for frictionally resisting rotation of the latter with a braking force that varies in response to changes in the tension of the tape engaged by guide pin 52. Further, as disclosed in detail in U.S. Pat. No. 3,740,492, the return run of the tape extending from guide pin 53 back to take-up reel 17 in the cassette may be engaged by a tension detecting pin 71 carried by a pivoted arm 72 which controls the braking force applied by a brake shoe not shown) to the take-up reel support member 22, whereby to regulate the take-up tension in the tape during recording, normal reproducing and fast-forward operations and the back tension in the tape during a rewind operation. It should be noted that, during a loading operation of device 30, the band brake associated with arm 54 for frictionally resisting turning of supply reel 16 may be effective to prevent slackening of the tape. Further, during an unloading operation of device 30, that is, during the return rotation of support ring 31 from its operative position to its stop position and from the latter position to the starting or inactive position, the drive assembly associated with take-up reel support member 22 may be effective to rotate the latter for winding the tape on take-up reel 17 as the tape loop is progressively reduced in size and finally returned to the cassette housing.

Figure 2:
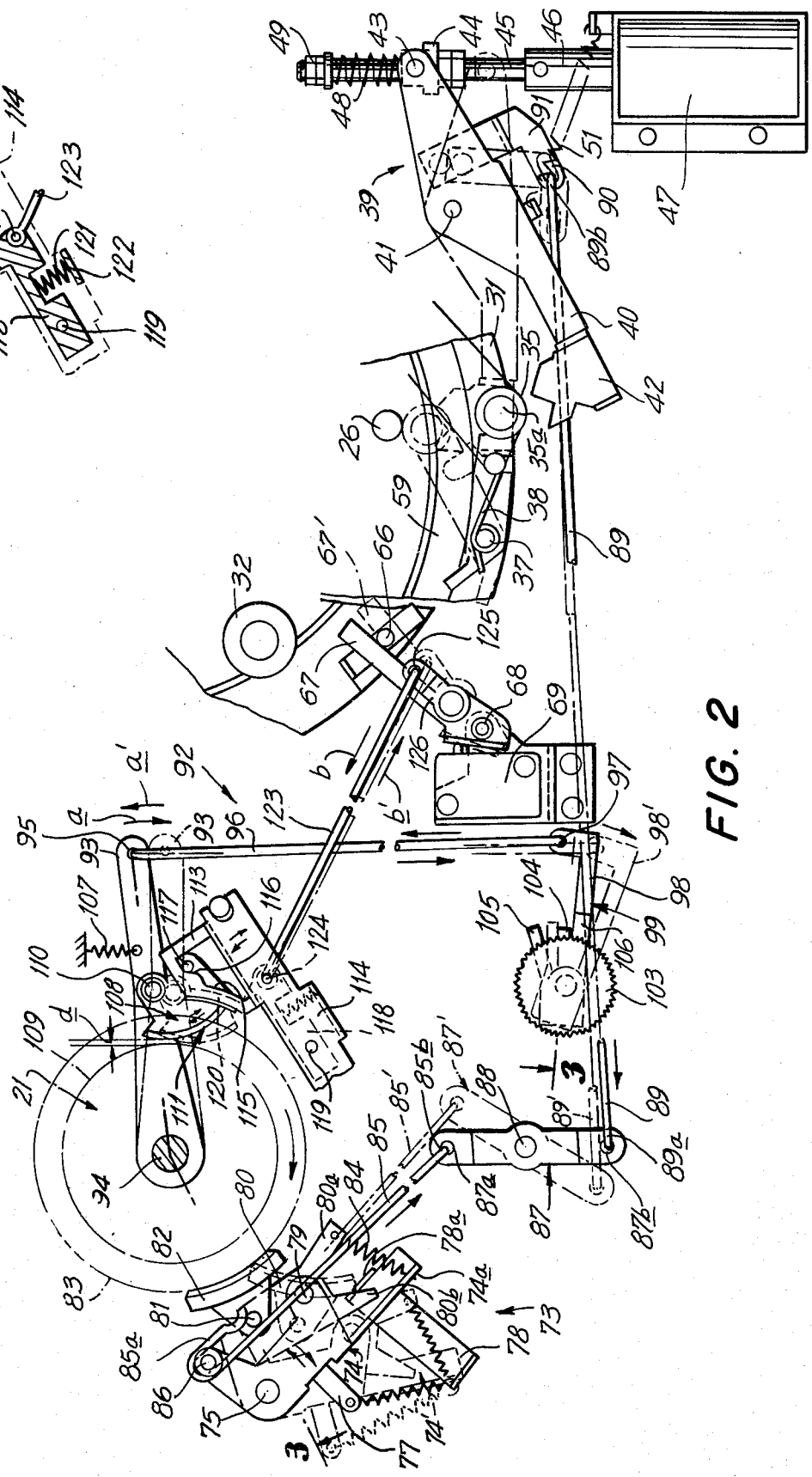
FIG. 2 is an enlarged, fragmentary schematic top plan view of a portion of the apparatus shown on FIG. 1 in association with a device according to an embodiment of this invention for adjusting the longitudinal position of the magnetic tape during a still motion reproducing operation of the apparatus.

Referring now to FIG. 2, it will be seen that, in accordance with the present invention, the above generally described recording and/or reproducing apparatus 10 has a limiter brake device 73 associated with supply reel support member 21 in addition to the previously mentioned band brake (not shown). The limiter brake device 73 is shown to include a support arm 74 pivotally mounted adjacent one of its ends on an upstanding pivot pin 75 extending from chassis 12 adjacent reel support member 21. A spring 76 is connected between an extension 77 of arm 74 and an anchor plate or bracket 78 secured to the chassis for urging arm 74 to turn in the counterclockwise direction, as viewed on FIG. 2, that is, in the direction toward reel support member 21. The turning of arm 74 by spring 76 in the direction toward reel support member 21 is limited by the engagement of arm 74 against a stop 78a provided on bracket 78, and which defines the operative position of arm 74 shown in full lines. A pivot pin 79 is carried by support arm 74 and provides a pivotal mounting thereon for a brake support lever 80. One end of brake support lever 80 carries a pivot pin 81 on which a brake shoe 82 is centrally mounted for frictional engagement with a brake drum 83 (FIGS. 2 and 3) formed on reel support member 21. The opposite end portion of lever 80 is bifurcated to provide two spaced arms 80a and 80b (FIG. 2). A spring 84 is connected between arm 80a of lever 80 and a flange 74a of arm 74 for urging lever 80 to pivot relative to arm 74 in the clockwise direction, as shown, that is, in the direction moving pivot pin 81, and hence brake shoe 82 toward brake drum 83. The pivoting of lever 80 relative to arm 74 under the influence of spring 84 is limited by the engagement of lever arm 80b against flange 74a.

The several parts of limiter brake device 73 are dimensioned and relatively located so that, when support arm 74 is in its operative position against stop 78a, as shown in full lines on FIG. 2, the engagement of brake shoe 82 against brake drum 83 occurs with lever 80 angularly positioned relative to arm 74 so as to space arm 80b from flange 74a. Further, springs 76 and 84 are relatively dimensioned so that the force of spring 76 urging arm 74 in the counterclockwise direction to its operative position against stop 78a is substantially greater than the force of spring 84 urging lever 80 to turn in the clockwise direction relative to arm 74. Thus, with arm 74 in its operative position, the braking force resulting from the engagement of shoe 82 with drum 83 is dimensioned so that the braking force applied to supply reel support member 21 by limiter brake device 73, in the operative condition of the latter, is sufficient to halt the rotation of reel support member 21, and hence of the supply reel 16 coupled therewith, when such rotation results from the driving of the take-up reel support member 22 through the frictional clutch element 24, for example, during a still motion reproducing operation of apparatus 10. However, the dimensioning of spring 84 is selected so that, when reel support member 21 is directly rotated, as during a rewind operation of apparatus 10, or when supply reel support member 21 is rotated in response to the direct driving of take-up reel support member 22 during a fast forward operation of the apparatus, the braking force applied by shoe 82 to drum 83 is insufficient to halt rotation of reel support member 21 and merely acts to limit the speed at which the rewind and fast forward operations are conducted.

In order to effect the release of limiter brake device 73, a link rod 85 is formed with a hook configuration 85a at one end which engages about a pin 86 on brake support arm 74, while the other end of link rod 85 is formed with an eye 85b engaging a hole 87a at one end of a lever 87. The lever 87 is pivotally mounted intermediate its ends on a pivot pin 88 extending from chassis 12. The opposite end of lever 87 has a hole 87b engaged by an eye 89a formed at one end of a link rod 89. The other end of rod 89 is formed with a hook 89b engaging in a slot 90 formed in a bracket 91 which is secured to lever 40 of pinch roller actuating device 39.

It will be noted that, when solenoid 47 is deenergized, for example, during fast forward, rewind and still motion reproducing operations of apparatus 10, so that spring 51 can move lever 40 to the position shown in full lines on FIG. 2, bracket 91 pulls link rod 89 toward the right with the result that lever 87 and link rod 85 are disposed in the positions shown in full lines on FIG. 2 to permit spring 76 to dispose brake support arm 74 in its operative position, that is, to permit limiter brake device 73 to apply the previously described limiting brake force to supply reel support member 21. However, when solenoid 47 is energized during a recording or normal reproducing operation of apparatus 10 so as to move lever 40 to the position indicated in broken lines on FIG. 2, that is, to press pinch roller 35 against capstan 26 for driving the tape therebetween, the lost motion connection provided by the engagement of hook 89b in slot 90 is taken up and bracket 91 displaces link rod 89 toward the left, as viewed on FIG. 2, for example to the position indicated in broken lines at 89', so that lever 87 and link rod 85 are displaced to the positions indicated in broken lines at 87' and 85', respectively. It will be apparent that the movement of link rod 85 to the position 85' causes its hook 85a to pull on pin 86 and thereby angularly displace brake support arm 74 in the clockwise direction to the inoperative or released position indicated in broken lines at 74', and thereby to free brake shoe 82 from drum 83. Thus, during a recording or normal reproducing operation of apparatus 10 limiter brake device 73 is inoperative or released to permit supply reel support member 21 to turn in the direction for unwinding tape from the supply reel 16 coupled therewith in response to the driving of take-up reel support member 22 by way of the frictional clutch element 24.

It will be apparent that, during a recording operation of apparatus 10, rotary heads 13a record video signals in successive parallel record tracks that extend obliquely across the tape T at an angle to the longitudinal direction of the latter determined by the helical path of the tape on guide drum 11, the rotational speed of heads 13a and the speed at which the tape is longitudinally driven by the cooperative action of capstan 26 and pinch roller 35. Similarly, during a normal reproducing operation of apparatus 10, the rotary speed of heads 13a and the speed at which capstan 26 is rotated for driving the tape in cooperation with pinch roller 35 are the same as for the recording operation so that the rotary heads can be made to accurately scan the successive oblique record tracks for reproducing the successive fields of video signal information recorded therein.

However, during a still motion reproducing operation initiated by the actuation of pushbutton 70f during a normal reproducing operation, the longitudinal movement of the tape is halted by the movement of pinch roller 35 away from capstan 26 and by the operation of limiter brake device 73 so that rotary heads 13a will repeatedly scan the tape along a track which extends obliquely thereacross at an angle determined only by the helical path of the tape on guide drum 11. Thus, during a still motion reproducing operation of apparatus 10, rotary heads 13a repeatedly scan the tape along a track which is inclined relative to the oblique record tracks, that is, the tracks in which the video signals have been previously recorded. Depending upon the random position of the tape in which the longitudinal movement thereof has been halted for a still motion reproducing operation, the track along which rotary heads 13a scan the stationary tape may have various relationships to the record track or tracks which are most nearly adjacent thereto. For example, the scanning track; that is, the track along which rotary heads 13a repeatedly scan the stationary tape, may intersect a record track adjacent the middle of the latter and may deviate from such record track at the opposite ends thereof. Alternatively, the scanning track may intersect two adjacent record tracks at the opposite ends of the latter with the middle portion of the scanning track extending across the guard band or spacing between the two adjacent tracks. In either case, the video signals repeatedly reproduced during a still motion reproducing operation will contain so-called guard band noises which produce characteristic disturbances in the video picture obtained when the reproduced video signals are displayed by a monitor or other video image display device (not shown). However, if the tape is halted with the scanning track of the rotary heads extending, at its middle portion, across a guard band or spacing between two adjacent tracks, the disturbance due to the guard band noises will extend horizontally across the center of the picture or image displayed on the monitor screen and thus be most disruptive. On the other hand, if the stationary tape is positioned so that the scanning track of rotary heads 13a intersects a record track adjacent the middle of the latter, the disturbances due to the guard band noises will extend across the top and bottom of the displayed stationary or still motion picture, at which locations the disturbances due to the guard band noises are least conspicuous and interfere as little as possible with viewing of such picture.

Figure 3:
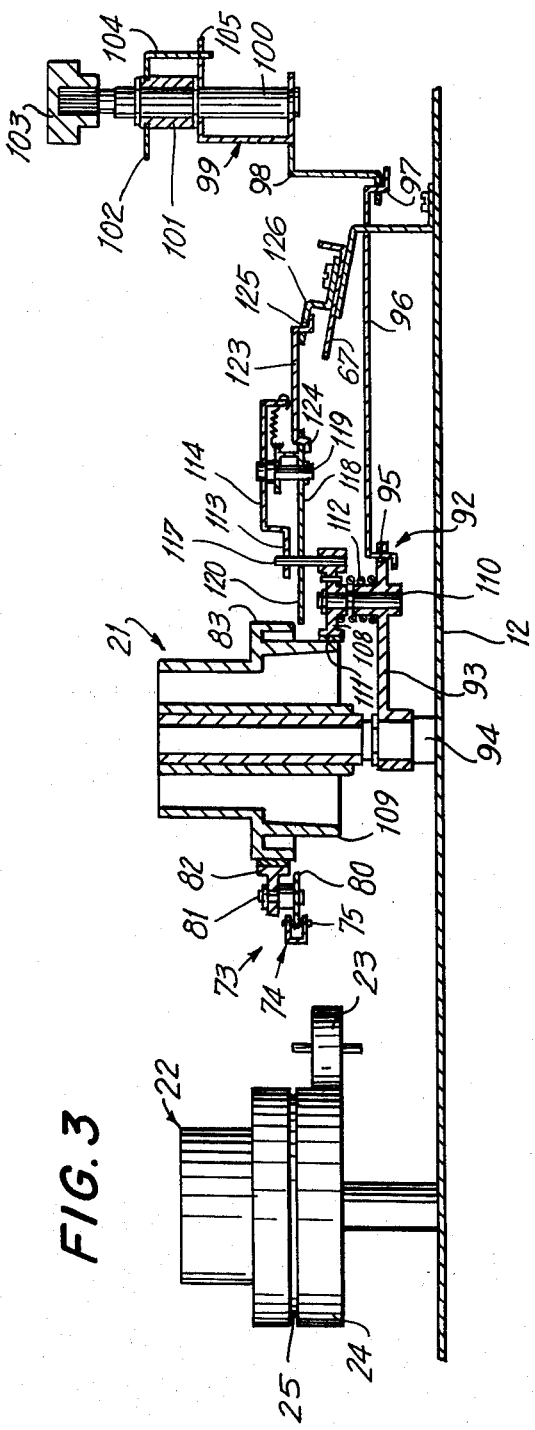
FIG. 3 is a schematic sectional view of the device according to this invention as viewed along the line 3—3 on FIG. 2.

Therefore, in accordance with this invention, the recording and/or reproducing apparatus 10 is provided with a device 92 by which the position of the magnetic tape wrapped about guide drum 11 and having video signals recorded thereon can be conveniently adjusted in the longitudinal direction of the tape during a still motion reproducing operation of the apparatus so as to cause disturbances due to guard band noises contained in the repeatedly reproduced video signals to occupy the positions at the top and bottom of the resulting display picture or image at which they are least conspicuous. The device 92 according to this invention is shown to comprise an arm 93 pivotally mounted, at one end, on the spindle 94 which rotatably supports supply reel support member 21 so as to be swingable in a horizontal plane below reel support member 21 (FIGS. 2 and 3). The outer or free end of arm 93 is pivotally connected, as at 95, to one end of a link rod 96 having its other end pivotally connected, as at 97, to the free end of an arm 98 which is an integral part of an actuating member 99. As shown particularly on FIG. 3, the actuating member 99 is secured on the lower end portion of a shaft 100 turnable in a bearing 101 carried by a bracket 102 suitably fixed to chassis 12, with a manually actuable knob 103 being secured on the upper end portion of shaft 100 for turning the latter. A finger 104 may depend from bracket 102 and engage loosely between two angularly spaced apart stop elements 105 and 106 provided on actuating member 99 for limiting the angular displacement or oscillation of knob 103 and actuating member 99 about the axis of shaft 100. It will be apparent that such limited oscillation of member 99, and the resulting reciprocation of link rod 96, causes angular displacement of arm 93 in the direction of the arrows $a$ and $a'$ on FIG. 2. A spring 107 is shown to be connected between arm 93 and a suitable anchor on chassis 12 for urging arm 93 to turn in the direction of the arrow $a'$ to a normal position defined by the engagement of stop member 106 against finger 104, as shown on FIG. 2.

The device 92 according to this invention is further shown to include a drive member 108 mounted on the arm 93 so as to have wedge-like engagement with the cylindrical surface of a skirt 109 on supply reel support member 21 when arm 93 is angularly displaced in the direction of the arrow $a'$. More specifically, and as shown particularly on FIG. 4, the drive member 108 is shown to be pivotally mounted on a pivot pin 110 supported by arm 93 and to have an arcuate drive surface 111 which is eccentric in respect to the pivoting axis of drive member 108 on arm 93. By reason of the eccentricity of arcuate drive surface 111 in respect to the pivoting axis of drive member 108, the opposite end portions 111a and 111b of surface 111 are respectively at radial distances $r_1$ and $r_2$ from the pivoting axis defined by pin 10 that are respectively smaller and larger than the radial distance $r_3$ from such pivoting axis of drive member 108 to the cylindrical surface of skirt 109. Therefore, when drive member 108 is turned relative to arm 93 to a postion in which end portion 111a of surface 111 confronts the cylindrical surface of skirt 109, a clearance $d$ is present therebetween, as shown on FIG. 2, to permit turning of supply reel support member 21 independently of angular displacement of arm 93. A torsion spring 112 (FIG. 3) extends around the pivot of drive member 108 and has its opposite ends engaged with arm 93 and drive member 108 for urging the latter relative to arm 93 in the clockwise direction, as viewed on FIGS. 2 and 4, whereby to urge the arcuate surface 111 of drive member 108 into engagement with the cylindrical surface of skirt 109.

Figure 4:
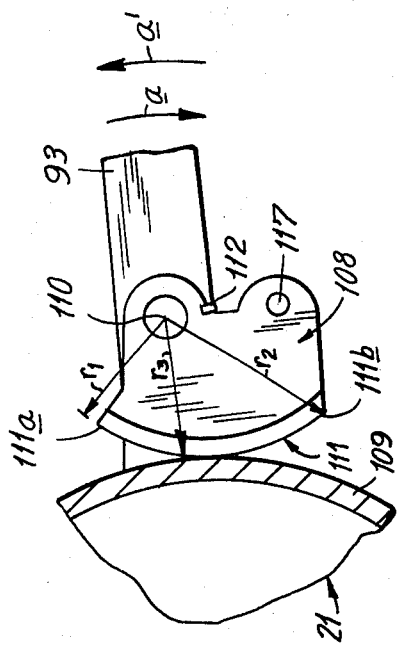
FIG. 4 is an enlarged detail plan view of a drive member forming part of the device for adjusting the longitudinal position of the tape.

It will be apparent that, when spring 112 is free to urge arcuate drive surface 111 into contact with skirt 109, the frictional contact between surface 111 and skirt 109 during angular displacement of arm 93 in the direction of the arrow $a$ on FIGS. 2 and 4 tends to further turn drive member 108 in the clockwise direction relative to arm 93 and thereby increases the pressure of the contact of member 108 with skirt 109 so that such angular displacement of arm 93 causes similar angular displacement or turning of supply reel support member 21. On the other hand, when arm 93 is angularly displaced in the opposite direction, that is, in the direction of the arrow $a'$, during engagement of arcuate drive surface 111 with skirt 109, the frictional force due to such engagement tends to turn drive member 108 in the counterclockwise direction about its pivot 110 relative to arm 93 so as to reduce the pressure of contact of surface 111 with skirt 109 and thereby permit angular displacement of arm 93 in the direction of the arrow $a'$ without corresponding turning of supply reel support member 21.

In order to hold the surface 111 of drive member 108 out of engagement with skirt 109 except when knob 103 is manually oscillated to effect corresponding oscillations or angular displacements of arm 93, device 92 according to this invention is further shown to include a fixed cam plate 113 extending from a bracket 114 which is suitably secured on chassis 12 (FIGS. 2 and 3). Cam plate 113 is shown to have a cam surface 115 which is generally concentric with the axis of supply reel support member 21 and which is recessed relative to a radially raised portion 116 at one end of cam surface 115. Further, a cam follower pin 117 projects upwardly from drive member 108 and is urged toward the cam surface 115–116 in response to the turning of drive member 108 by spring 112. It will be apparent that, when arm 93 is urged by spring 107 in the direction of the arrow $a'$ to its normal position shown in full lines on FIG. 2, cam follower pin 117 rides on the radially raised end cam surface portion 116 and thereby turns drive member 108 relative to arm 93 in the counterclockwise direction to the position shown on FIG. 2 so as to provide the clearance or space $d$ between surface 111 and skirt 109. However, when knob 103 is turned in the clockwise direction, for example, to angularly displace the arm 98 to the position shown in broken lines at 98', the resulting angular displacement of arm 93 in the direction of the arrow $a$ to the position indicated in broken lines at 93' moves cam follower pin 117 off the radially raised end cam surface portion 116 so as to permit spring 112 to turn drive member 108 and thereby achieve the previously described driving engagement of surface 111 with skirt 109. Thereafter, during further turning of knob 103 in the clockwise direction, supply reel support member 21 is turned with arm 93 in the direction of the arrow $a$. When the limit for turning knob 103 in the clockwise direction has been attained, that is, when stop 105 engages finger 104, the release of knob 103 permits spring 107 to effect the return angular displacement of arm 93 in the direction of the arrow $a'$, and during such return angular displacement of arm 93 surface 111 of drive member 108 will slide relative to the surface of skirt 109. Upon return of arm 93 to the normal position shown in full lines on FIG. 2, cam follower pin 117 again engages the cam surface end portion 116 for once more disengaging drive surface 111 from skirt member 109. Thus, it will be seen that incremental turning of supply reel support member 21 in the clockwise direction can be effected by repeated oscillation of manually actuable knob 103.

It will be apparent that the above described incremental turning of supply reel support member 21 by manual actuation of knob 103 is intended to be effected during a still motion reproducing operation of apparatus 10, at which time limiter brake device 73 is operative to resist turning of supply reel support member 21. Thus, the incremental turning of support member 21 in the clockwise direction is effected against the resistance or braking force of device 73 as determined by spring 84, and such braking force ensures that supply reel support member 21 is held against turning with arm 93 during each angular displacement of the latter in the direction of the arrow $a'$. Further, as is apparent from FIG. 1, the incremental turning of support member 21 in the clockwise direction tends to unwind the tape from the associated supply reel 16. However, since th reel drive device associated with take-up reel support member 22 urges the latter to rotate in the direction for winding the tape on the associated take-up reel 17 during a still motion reproducing operation, the described incremental turning of supply reel 16 causes corresponding incremental longitudinal displacement of the tape wrapped about drum 11. Thus, when a still motion reproducing operation of apparatus 10 is selected by actuation of pushbutton 70f, the operator may manually actuate knob 103 until such time as the disturbances due to guard band noises in the repeatedly reproduced video signals occupy the desired least conspicuous locations at the top and bottom of the resulting image of still picture displayed on a monitor.

During a recording or normal reproducing operation of apparatus 10, spring 107 urges arm 93 to the normal position shown in full lines on FIG. 2 at which cam follower pin 117 rides on the radially raised cam end portion 116 so as to hold surface 111 of drive member 108 spaced from skirt 109. However, the inadvertent manipulation of knob 103 during a recording or normal reproducing operation will not cause damage to the apparatus by reason of two characteristics thereof. First of all, during recording or normal reproducing operations of the apparatus, supply reel support member 21 is turned relatively slowly in the clockwise direction, as viewed on FIG. 2, in response to the driving of take-up reel support member 22 by way of the frictional clutch element 24. Therefore, if knob 103 is inadvertently turned so as to move cam follower pin 117 off the radially enlarged end portion 116 of cam surface 115 and thereby permit engagement of drive surface 111 with skirt 109, the rotation of skirt 109 in the clockwise direction will cause the frictional force due to its engagement with surface 111 to turn drive member 108 in the counterclockwise direction relative to arm 93, thereby to release the contact pressure between drive member 108 and skirt 109. Further, the frictional contact of drive member 108 with skirt 109 during a recording or normal reproducing operation can, at worst, merely cause slippage of clutch element 24 relative to take-up reel support member 22.

However, it is important that drive member 108 of device 92 be positively prevented from engaging skirt 109 of supply reel support member 21 during fast forward and rewind operations of apparatus 10, and particularly during a rewind operation. The foregoing will be apparent from the fact that, during a rewind operation, supply reel support member 21 is turned in the counterclockwise direction at a relatively high speed. Therefore, if knob 103 is inadvertently turned during a rewind operation and surface 111 of drive member 108 is permitted to engage skirt 109 as a result of such turning of knob 103, then the frictional force due to engagement of skirt 109 with surface 111 would tend to turn drive member 108 in the clockwise direction relative to arm 93 for progressively increasing the contact pressure of drive member 108 with skirt 109, with the likelihood of damage to the apparatus resulting therefrom.

Therefore, in accordance with the present invention, means are provided for preventing operation of the device 92, that is, for positively retaining drive member 108 in the position relative to arm 93 shown on FIG. 2 at which the clearance $d$ exists between its surface 111 and skirt 109, even if knob 103 is manipulated inadvertently during a fast forward or rewind operation of apparatus 10. More specifically, as shown on FIGS. 2, 3 and 5, such means for preventing operation of device 92 includes a blocking member 118 pivotally mounted at 110 on bracket 114 and having an arcuate blocking finger 120 which extends along recessed cam surface 115. A spring 121 (FIG. 5) is interposed between blocking member 118 and an abutment 122 on bracket 114 for normally urging blocking member 118 to the position shown on FIG. 2 and at which the arcuate blocking finger 120 is retracted relative to cam surface 115. With blocking finger 120 retracted relative to cam surface 115, device 92 is free to operate in the manner indicated above for effecting incremental turning of supply reel support member 21 during a still motion reproducing operation. A link rod 123 is pivotally connected at one end, as at 124, to blocking member 118, while the other end of link rod 123 is pivotally connected at 125 to an arm 126 which is secured on the previously mentioned arm 67 for turning with the latter.

It will be apparent that, when support ring 31 of tape loading and unloading device 30 is in its operative position, as shown on FIG. 2, for a recording, normal reproducing or still motion reproducing operation of apparatus 10, the displacement of arm 67 by pin 66 to the position shown in full lines on FIG. 2 causes displacement of link rod 123 in the direction of the arrow $b$ so that spring 121 can move blocking member 118 to its inactive position shown on FIG. 2. However, during a fast forward or rewind operation of apparatus 10, at which time support ring 31 is only turned through approximately 60° from its starting or inactive position, as described above, arm 67 is free to be urged to its normal position indicated in broken lines at 67', with the result that link rod 123 is displaced in the direction of the arrow $b'$ on FIG. 2 for moving blocking member 118 to its operative position shown on FIG. 5. In such operative position, the arcuate blocking finger 120 projects beyond cam surface 115, that is, is substantially aligned with the radially enlarged cam surface end portion 116. Therefore, if knob 103 is inadvertently manipulated to angularly displace arm 93 in the direction of the arrow $a$ on FIG. 2 during a fast forward or rewind operation, cam follower pin 117 rides along blocking finger 120 and drive member 108 is thereby prevented from turning in the clockwise direction relative to arm 93 from the position shown on FIG. 2. Accordingly, engagement of drive surface 111 with skirt 109 is prevented even if knob 103 is inadvertently manipulated during a fast forward or rewind operation.

Although the device 92 according to this invention is particularly advantageously applied to a recording and-/or reproducing apparatus of the type intended for use with tape cassettes, in that the device 92 permits adjustment of the longitudinal position of the magnetic tape during a still motion reproducing operation without requiring access to the supply and take-up reels on which the tape is wound, it is apparent that the device 92 may also be employed in connection with an open-reel type recording and/or reproducing apparatus in which the reels are accessible.

Having specifically described a preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

We claim:

1. An apparatus for magnetically recording and/or reproducing video signals on a magnetic tape which is wound on, and extends between supply and take-up reels; comprising a cylindrical tape guide drum having rotary magnetic head means moved in a circular path substantially coinciding with the periphery of the drum, rotatable supply and take-up reel support members engageable by said supply and take-up reels, reel drive means for urging said take-up reel support member to rotate in the direction for winding the tape on said take-up reel, and thereby unwinding the tape from said supply reel, during normal recording and reproducing operations of the apparatus, a capstan spaced from said guide drum, tape guiding means engageable with the tape between said reels for guiding the tape in a helical path about at least a portion of said periphery of the drum and past said capstan, a pinch roller movable toward and away from said capstan with the tape therebetween, actuating means moving said pinch roller against said capstan for driving of the tape by the latter during said normal recording and reproducing operations and moving said pinch roller away from said capstan during a still motion reproducing operation of the apparatus for interrupting the driving of the tape by said capstan, brake means frictionally applied to said supply reel support member during said still motion reproducing operation for holding the supply reel against turning in response to the urging of said take-up reel support member in said direction for winding the tape on said take-up reel, and manually actuable means disposed adjacent said supply reel support member and having an engaging portion thereof normally spaced from said supply reel support member, said manually actuable means being actuable during said still motion reproducing operation so that said engaging portion thereof is urged into secure engagement with said supply reel support member and is responsive to manual control for overriding said brake means to turn the supply reel support member against the frictional resistance of said brake means and thereby displace said tape along said helical path so as to adjust the longitudinal position of the tape in respect to said circular path of the rotary head means.

2. An apparatus according to claim 1; in which said actuating means for the pinch roller includes spring means for moving the latter away from said capstan, an actuating lever swingable in one direction to move said pinch roller against said capstan over the opposition of said spring means, and electro-magnetic means energized during said normal recording and reproducing operations for swinging said lever in said one direction and being deenergized during said still motion reproducing operation for swinging said lever in the opposite direction; and further comprising brake actuating means connected with said lever for disengaging and engaging said brake means in response to swinging of said lever in said one direction and said opposite direction, respectively.

3. An apparatus according to claim 1, further comprising a tape loading and unloading device including support means rotatable around said drum between inactive and operative positions in an arcuate path that extends adjacent said capstan and said reel support members, and tape engaging means including said pinch roller mounted on said support means and being movable with the latter in said arcuate path for engaging the tape between said reels positioned on said reel support members with said support means in said inactive position and for withdrawing a progressively extended loop of said tape from at least one of said reels and wrapping one side of the extended tape loop about at least said portion of the periphery of said guide drum in response to movement of said support means from said inactive position to said operative position at which said pinch roller is located within said tape loop adjacent said capstan with the tape of said loop therebetween.

4. An apparatus according to claim 3; in which said reel drive means is adapted to provide fast forward and rewind operations of the apparatus with said support means of the tape loading and unloading device at a position intermediate said inactive and operative positions thereof, and means to prevent turning of said supply reel support member by said manually actuable means when said support means is displaced from said operative position thereof.

5. An apparatus according to claim 3; in which said supply and take-up reels are contained in a cassette housing having an access opening through which the tape between said reels can be withdrawn by said tape loading and unloading device, and said supply and take-up reel support members extend into said cassette housing for engagement by said reels in the latter.

6. An apparatus for magnetically recording and/or reproducing video signals on a magnetic tape which is wound on, and extends between supply and take-up reels; comprising a cylindrical tape guide drum having rotary magnetic head means moved in a circular path substantially coinciding with the periphery of the drum, rotatable supply and take-up reel support members engageable by said supply and take-up reels, said supply reel support member has a cylindrical surface; reel drive means for urging said take-up reel support member to rotate in the direction for winding the tape on said take-up reel, and thereby unwinding the tape from said supply reel, during normal recording and reproducing operations of the apparatus, a capstan spaced from said guide drum, tape guiding means engageable with the tape between said reels for guiding the tape in a helical path about at least a portion of said periphery of the drum and past said capstan, a pinch roller movable toward and away from said capstan with the tape therebetween, actuating means moving said pinch roller against said capstan for driving of the tape by the latter during said normal recording and reproducing operations and moving said pinch roller away from said capstan during a still motion reproducing operation of the apparatus for interrupting the driving of the tape by said capstan, brake means frictionally applied to said supply reel support member during said still motion reproducing operation for holding the supply reel against turning in response to the urging of said take-up reel support member in said direction for winding the tape on said take-up reel, manually actuable means disposed adjacent said supply reel support member and having an engaging portion thereof normally spaced from said supply reel support member, said manually actuable means being actuable during said still motion reproducing operation so that said engaging portion thereof is urged into secure engagement with said supply reel support member and is responsive to manual control for turning the supply reel support member against the frictional resistance of said brake means and thereby adjusting the longitudinal position of the tape in respect to said circular path of the rotary head means; and in which said manually actuable means for turning the supply reel support member includes an arm pivoted about the axis of rotation of said supply reel support member, means for angularly displacing said arm in opposed directions, and a drive member on said arm having a portion thereof disposed for wedge-like engagement with said cylindrical surface of the supply reel support member when said arm is angularly displaced in one of said directions and sliding relative to said cylindrical surface when said arm is angularly displaced in the other of said directions.

7. An apparatus according to claim 6; in which said manually actuable means for turning the supply reel support member further includes means holding said drive member away from said cylindrical surface of the supply reel support member when said arm is angularly displaced in said other direction to a predetermined position.

8. An apparatus according to claim 6; in which said reel drive means is adapted to provide fast forward and rewind operations of the apparatus during which the tape is rapidly transferred between said supply and take-up reels; and further comprising means for holding said drive member away from said cylindrical surface of the supply reel support member during said fast forward and rewind operations.

9. An apparatus according to claim 6; in which said drive member is pivotally mounted on said arm and has an arcuate drive surface which is eccentric in respecct to the pivoting axis of said drive member on said arm, said arcuate drive surface has first and second opposite end portions at radial distances from said pivoting axis that are respectively larger and smaller than the radial distance from said pivoting axis of the drive member to said cylindrical surface of the supply reel support member, and said drive member is yieldably urged to pivot relative to said arm in the direction for moving said first end portion of the arcuate drive surface into facing relation to said cylindrical surface.

10. An apparatus according to claim 9; further comprising means operative, when said arm is angularly displaced in said other direction to a predetermined position, for holding said drive member relative to said arm in an inoperative position in which said second end portion of the arcuate drive surface faces toward and is spaced from said cylindrical surface of the supply reel support member.

11. An apparatus according to claim 10; in which said means for holding the drive member in said inoperative position thereof includes a cam follower pin on said drive member and a fixed cam member having a cam surface engaged by said pin, said cam surface has an end portion which is radially raised in respect to said axis of rotation of the supply reel support member and being engaged by said pin when said arm is near said predetermined position for holding said drive member in said inoperative position, and the remaining portion of said cam surface is radially recessed to permit said drive member to pivot in said direction in which it is urged when said arm is angularly displaced in said one direction away from said predetermined position.

12. An apparatus according to claim 11; in which said reel drive means is adapted to provide fast forward and rewind operations during which the tape is rapidly transferred between said supply and take-up reels; and further comprising a blocking member extending in said radially recessed portion of the cam surface during said fast forward and rewind operations to prevent pivoting of said drive member from said inoperative position, and means for displacing said blocking member out of said recessed portion of the cam surface during at least said slow motion reproducing operation of the apparatus.

13. An apparatus for magnetically recording and/or reproducing video signals on a magnetic tape which is wound on, and extends between supply and take-up reels; comprising a cylindrical tape guide drum having rotary magnetic head means moved in a circular path substantially coinciding with the periphery of the drum, rotatable supply and take-up reel support members engageable by said supply and take-up reels, reel drive means for urging said take-up reel support member to rotate in the direction for winding the tape on said take-up reel, and thereby unwinding the tape from said supply reel, during normal recording and reproducing operations of the apparatus, a capstan spaced from said guide drum, tape guiding means engageable with the tape between said reels for guiding the tape in a helical path about at least a portion of said periphery of the drum and past said capstan, a pinch roller movable toward and away from said capstan with the tape therebetween, actuating means moving said pinch roller against said capstan for driving of the tape by the latter during said normal recording and reproducing operations and moving said pinch roller away from said capstan during a still motion reproducing operation of the apparatus for interrupting the driving of the tape by said capstan, brake means frictionally applied to said supply reel support member during said still motion reproducing operation for holding the supply reel against turning in response to the urging of said take-up reel support member in said direction for winding the tape on said take-up reel, manually actuable means disposed adjacent said supply reel support member and having an engaging portion thereof normally spaced from said supply reel support member, said manually actuable means being actuable during said still motion reproducing operation so that said engaging portion thereof is urged into secure engagement with said supply reel support member and is responsive to manual control for turning the supply reel support member against the frictional resistance of said brake means and thereby adjusting the longitudinal position of the tape in respect to said circular path of the rotary head means; a tape loading and unloading device including support means rotatable around said drum between inactive and operative positions in an arcuate path that extends adjacent said capstan and said reel support members, and tape engaging means including said pinch roller mounted on said support means and being movable with the latter in said arcuate path for engaging the tape between said reels positioned on said reel support members with said support means in said inactive position and for withdrawing a progressively extended loop of said tape from at least one of said reels and wrapping one side of the extended tape loop about at least said portion of the periphery of said guide drum in response to movement of said support means from said inactive position to said operative position at which said pinch roller is located within said tape loop adjacent said capstan with the tape of said loop therebetween; means to prevent turning of said supply reel support member by said manually actuable means when said support means is displaced from said operative position thereof; and in which said manually actuable means for turning the supply reel support member includes an arm pivoted about the axis of rotation of said supply reel support member, means for angularly displacing said arm in opposed directions, and a drive member movably mounted on said arm having a portion thereof disposed for wedge-like engagement with said supply reel support member in response to angular displacement of said arm in one of said directions and for sliding relative to said supply reel support member in response to angular displacement of said arm in the other of said directions; and in which said means to prevent turning of said supply reel support member by said manually actuable means includes blocking means having an operative position for blocking said wedge-like engagement of said drive member with said supply reel support member and an inoperative position in which said drive member is free for said wedge-like engagement, means for urging said blocking means to said operative position, and means on said support means of the tape loading and unloading device for moving said blocking means to its said inoperative position when said support means is at said operative position of the latter.

* * * * *

UNITED STATES PATENT OFFICE
CERTIFICATE OF CORRECTION

Patent No. 3,968,517  Dated July 6, 1976

Inventor(s) Toshihiko Chimura and Hirokimi Iwata

It is certified that error appears in the above-identified patent and that said Letters Patent are hereby corrected as shown below:

Column 4, line 66, change "thereof" to --thereon--,

Column 11, line 1, after "is" insert --determined by the force exerted by spring 84. Furthermore, spring 84 is--.

Signed and Sealed this

Fourth Day of January 1977

[SEAL]

Attest:

RUTH C. MASON
*Attesting Officer*

C. MARSHALL DANN
*Commissioner of Patents and Trademarks*